T. MORAN.
Shade-Holders.

No. 141,806. Patented August 12, 1873.

Witnesses
John Becker.
Fred Haynes

Thomas Moran
by his Attorneys
Brown & Allen

UNITED STATES PATENT OFFICE.

THOMAS MORAN, OF NEW YORK, N. Y.

IMPROVEMENT IN SHADE-HOLDERS.

Specification forming part of Letters Patent No. 141,806, dated August 12, 1873; application filed May 23, 1873.

*To all whom it may concern:*

Be it known that I, THOMAS MORAN, of the city, county, and State of New York, have invented an Extension Shade-Holder, of which the following is a specification:

This shade-holder consists of a socket, which fits the gasalier or lamp on which it is desirable to use it, and is provided with arms, on which slide elevated supporters that receive and hold the shade. The supporters are retained in place on the arms by means of endless screws, which work in racks provided on the arms. Springs are provided in or on the supporters, to enable them to be moved independently of the screws; but these latter will be used when the adjustment is slight, and they enable the supporters to be very accurately adjusted relatively to each other.

Figure 1:
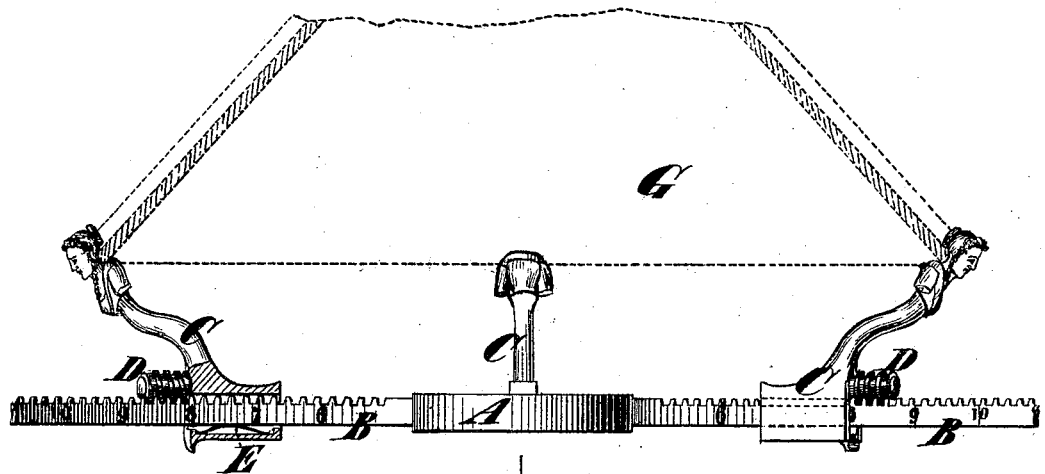
Figure 3:
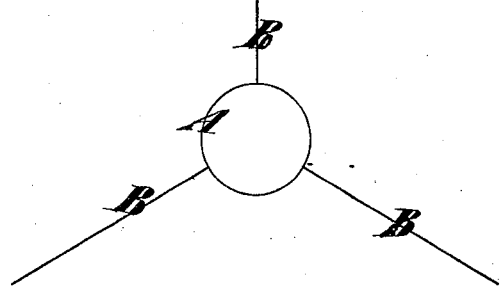
Figure 2:
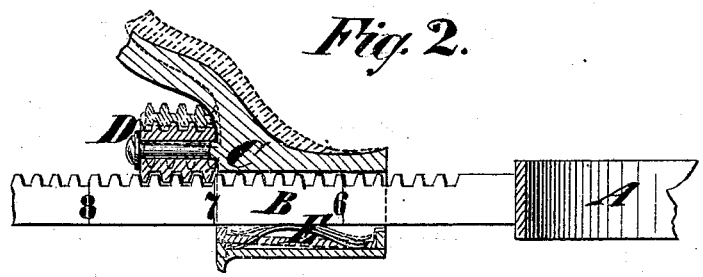

In the accompanying drawing, Figure 1 is a side view of a shade-holder made according to my invention. Fig. 2 is a detail view of one of its arms, representing the shade-supporter in section; and Fig. 3 is a diagram of the device.

Similar letters of reference indicate corresponding parts in all the figures.

A is the ring or socket of the shade-holder. It is of suitable size to fit the gasalier or lamp on which it is used. From it three arms, B, branch out radially, to receive the supporters C that hold the shade. These arms have formed on their upper sides toothed racks, that engage endless screws D arranged on the supports C. The supporters C consist simply of sockets, which fit loosely on the arms B, and are furnished themselves with arms that bend upward and outward, so that they elevate the shade from the arms B considerably. These support-arms are represented as terminating in women's busts, and the shade G (which is drawn in dotted lines) rests on their necks, just between the shoulders and backs of the heads. The endless screws D, before mentioned, are arranged on pivots on the outer end of the arms. In the sockets of the supporters, between their bottoms and the under side of the arms B, springs E are interposed, which hold the sockets down on the face of the racks, and maintain the screws D in gear with them.

To adjust the supporters any considerable distance, their outer ends are tilted up to free the screws from contact with the racks, and then the supporters may be slid along to the position desired. Afterward the supporters are let go, and their springs E throw the screws into gear with the racks again. Should the position of the supporters then be not quite right, the screws may be turned to adjust them. Whenever the adjustment needed is but slight it will be produced solely by the screws.

In some cases I may dispense with the screws, and use spring-catches to retain the supporters in place on the arms.

A scale of inches may be used, and fractional parts thereof, on the arms B B, for the purpose of facilitating the adjustment of the supports for globes of various sizes.

What I claim as my invention is—

The combination of the toothed racks on the arms B, the endless screws D on the supporters C, and the springs E, essentially as and for the purpose described.

THOS. MORAN.

Witnesses:
HENRY T. BROWN,
MICHAEL RYAN.